United States Patent
Ogasahara

(10) Patent No.: US 9,083,883 B2
(45) Date of Patent: Jul. 14, 2015

(54) CAMERA MODULE, ELECTRONIC APPARATUS, AND PHOTOGRAPHING METHOD FOR IMAGE STABILIZATION AND INCREASING RESOLUTION

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 626 days.

(21) Appl. No.: 13/353,876

(22) Filed: Jan. 19, 2012

(65) Prior Publication Data

US 2012/0188387 A1    Jul. 26, 2012

(30) Foreign Application Priority Data

Jan. 26, 2011 (JP) ................................. 2011-013960

(51) Int. Cl.
*H04N 5/228* (2006.01)
*H04N 5/232* (2006.01)

(52) U.S. Cl.
CPC ......... *H04N 5/2328* (2013.01); *H04N 5/23232* (2013.01); *H04N 5/23258* (2013.01)

(58) Field of Classification Search
CPC ................................................. H04N 5/23232
USPC ........................................................ 348/208.99
See application file for complete search history.

(56) References Cited

U.S. PATENT DOCUMENTS

| | | | | |
|---|---|---|---|---|
| 2006/0087561 A1* | 4/2006 | Kojima et al. | | 348/208.5 |
| 2009/0238405 A1* | 9/2009 | Buznach | | 382/103 |
| 2010/0165145 A1* | 7/2010 | Kuroki | | 348/231.2 |
| 2010/0246954 A1* | 9/2010 | Kim et al. | | 382/170 |
| 2010/0328502 A1 | 12/2010 | Ogasahara | | |
| 2011/0050991 A1* | 3/2011 | Bellers et al. | | 348/441 |
| 2012/0050474 A1* | 3/2012 | Segall | | 348/43 |

FOREIGN PATENT DOCUMENTS

| | | |
|---|---|---|
| JP | 2006-128780 A | 5/2006 |
| JP | 2008-147715 A | 6/2008 |
| JP | 2008-148022 | 6/2008 |
| JP | 2009-116098 | 5/2009 |
| JP | 4487944 | 4/2010 |
| JP | 2010-141661 | 6/2010 |

OTHER PUBLICATIONS

Office Action issued Dec. 24, 2013, in Japanese Patent Application No. 2011-013960 with English Translation.
Office Action issued Sep. 24, 2013 in Japanese Patent Application No. 2011-013960 (with English-language translation).

* cited by examiner

*Primary Examiner* — Usman Khan
(74) *Attorney, Agent, or Firm* — Oblon, McClelland, Maier & Neustadt, L.L.P.

(57) ABSTRACT

According to one embodiment, a camera module includes an image stabilization section and a superposing section. The image stabilization section adjusts a position of a correction lens such that a second image, which is obtained in succession to a first image, is moved by a movement less than a length of one pixel relative to the first image. The superposing section superposes the first image and one or more of the second images that are taken after the position of the correction lens has been adjusted by the image stabilization section.

6 Claims, 6 Drawing Sheets

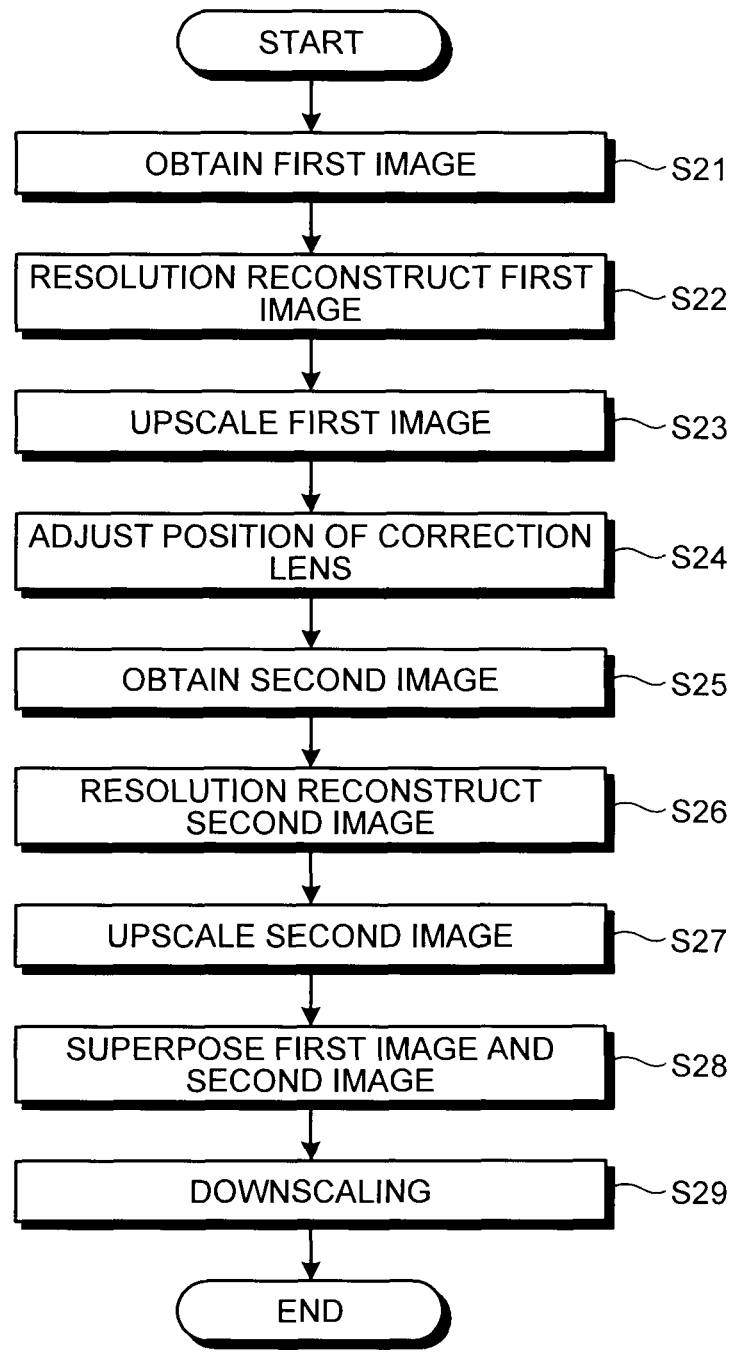

CAMERA MODULE, ELECTRONIC APPARATUS, AND PHOTOGRAPHING METHOD FOR IMAGE STABILIZATION AND INCREASING RESOLUTION

CROSS-REFERENCE OF RELATED APPLICATIONS

This application is based upon and claims the benefit of priority from Japanese Patent Application No. 2011-013960, filed on Jan. 26, 2011; the entire contents of all of which are incorporated herein by reference.

FIELD

Embodiments described herein relate generally to a camera module, an electronic apparatus, and a photographing method.

BACKGROUND

Conventionally, there is a technique to take an image with high resolution by an interpolation using successive frames. Such a technique can realize an effective improvement in obtaining high resolution in a movie filming a moving object. Contrary to this, in taking still images, a plurality of frames not including any movement of the object is simply superposed, and merely the resolution is increased by emulation in a filtering process; whereby there has been a case in which defects such as discoloration in an outline portion or the like occur in the image. As aforementioned, according to the conventional technique, there is a problem that there may be a case in which an affected image is taken. Further, especially in a camera module installed in a portable electronic apparatus, due to demands for decreasing size and weight, it is desirable to realize an improvement in obtaining high resolution by a simple configuration.

BRIEF EXPLANATION OF DRAWINGS

FIG. 8 is a flow chart explaining procedures of a process for obtaining high resolution by the camera module.

DETAILED DESCRIPTION

In general, according to one embodiment, a camera module includes an image pickup optical system, an image sensor, an image stabilization section, and a superposing section. A correction lens is assembled in the image pickup optical system. The image sensor takes an image of an object image imaged by the image pickup optical system. The image stabilization section performs an image stabilization by an adjustment of a position of the correction lens. A superposing section superposes a plurality of images obtained by an image-taking by the image sensor. The image stabilization section adjusts the position of the correction lens in an image-taking mode for obtaining higher resolution than resolution corresponding to a pixel number of the image sensor. The image stabilization section adjusts the position of the correction lens such that after a first image is taken by an image-taking by the image sensor, a second image is moved by a movement less than a length of one pixel relative to the first image. The second image is obtained in succession to the first image. The superposing section superposes the first image and one or more of the second images that are taken after the position of the correction lens has been adjusted by the image stabilization section.

Exemplary embodiments of a camera module, an electronic apparatus, and a photographing method will be explained below in detail with reference to the accompanying drawings. The present invention is not limited to the following embodiments.

Figure 1:
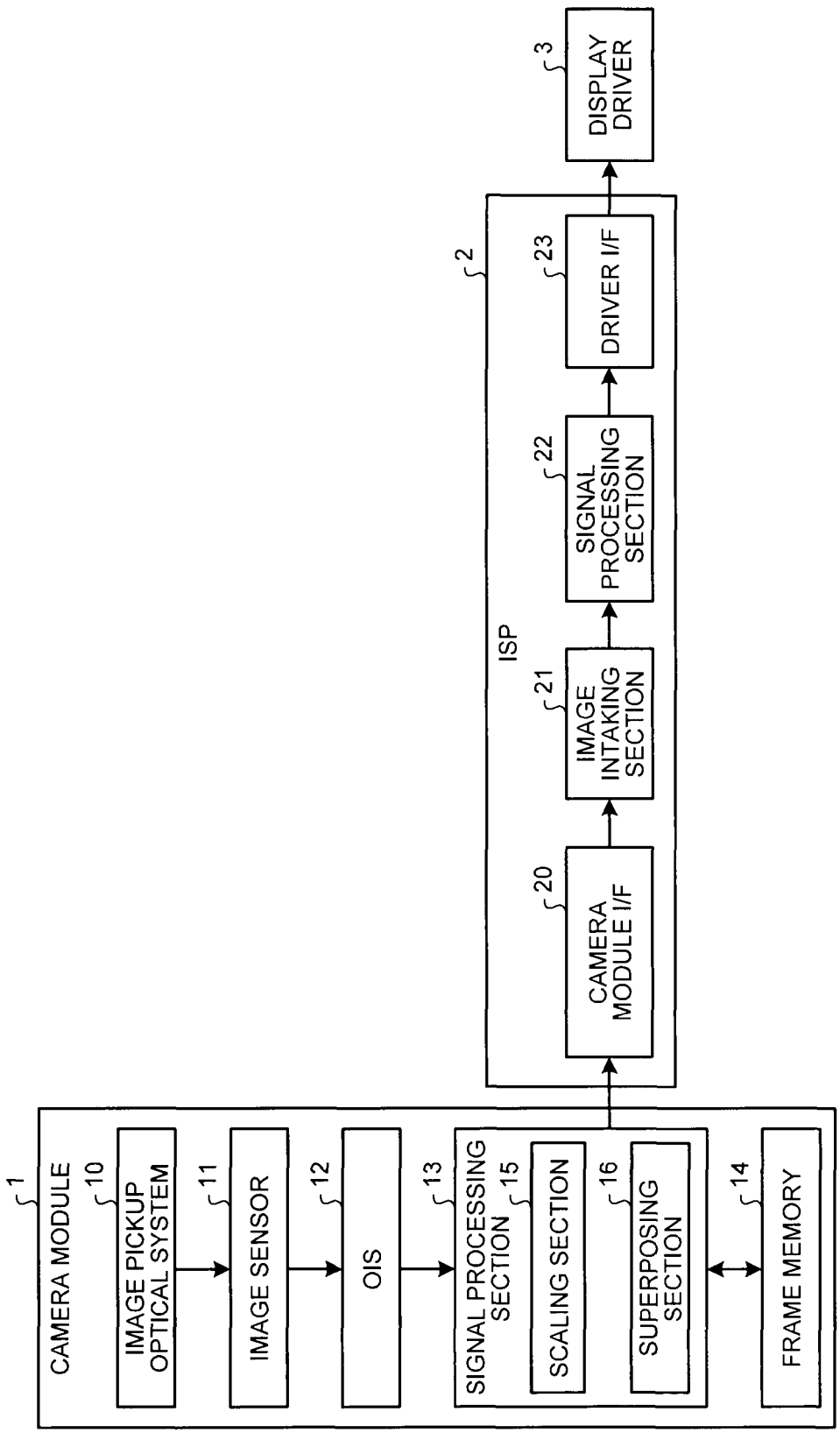
FIG. 1 is a block diagram illustrating a schematic configuration of an electronic apparatus including a camera module of a first embodiment.

FIG. 1 is a block diagram illustrating a schematic configuration of the electronic apparatus including the camera module of the first embodiment. The electronic apparatus includes a camera module 1 and an ISP (Image Signal Processor) 2. The electronic apparatus is, for example, a digital camera. The electronic apparatus to which the camera module 1 is adapted may be apparatuses other than the digital camera, for example, a portable terminal with a camera.

The camera module 1 includes an image pickup optical system 10, an image sensor 11, an OIS (optical image stabilization) 12, a signal processing section 13 and a frame memory 14.

The image pickup optical system 10 causes the image sensor 11 to image an object image. The image sensor 11 converts light taken in from the image pickup optical system 10 to signal charges, and takes an image of the object image. The OIS 12 is an optical image stabilization device (image stabilization section) that stabilizes a camera shake. The signal processing section 13 generates analog image signals by taking in signal values for red (R), green (G), and blue (B) in an order corresponding to a Bayer arrangement, and converts the obtained image signals from an analog format to a digital format. The frame memory 14 retains images obtained by an image-taking by the image sensor 11.

The signal processing section 13 includes a scaling section 15 and an superposing section 16. The scaling section 15 performs scaling on an image obtained by the image-taking by the image sensor 11. The superposing section 16 superposes a plurality of images obtained by the image-taking by the image sensor 11.

The ISP 2 includes a camera module I/F 20, an image intaking section 21, a signal processing section 22, and a driver I/F 23. RAW images obtained by the image-taking by the camera module 1 are taken into the image intaking section 21 from the camera module I/F 20.

The signal processing section 22 performs a signal process on the RAW images taken into the image intaking section 21. The driver I/F 23 outputs the image signals that have undergone the signal process in the signal processing section 22 to a display driver 3. The display driver 3 displays an image according to the image signals from the driver I/F 23.

Figure 2:
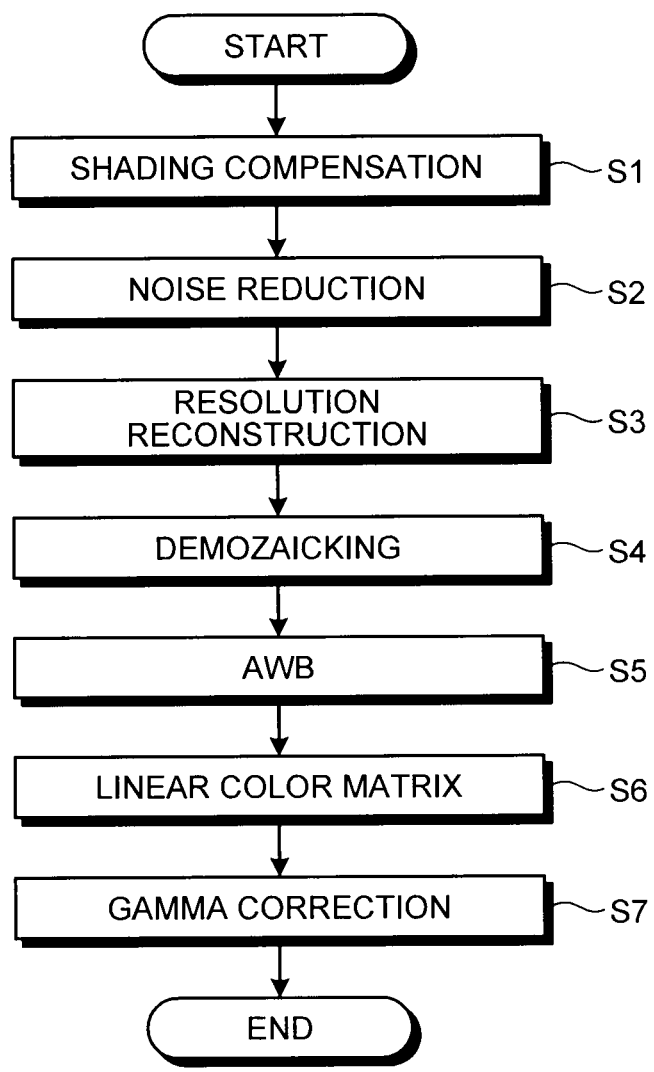
FIG. 2 is a flow chart explaining procedures of a signal process by a signal processing section of an ISP.

FIG. 2 is a flow chart explaining procedures of a signal process by the signal processing section of the ISP. The signal processing section 22 (see FIG. 1) performs shading compensation for the RAW images obtained by the image-taking by the camera module 1 (step S1). The shading compensation is a compensation of uneven brightness due to a difference in an intensity at a center portion and a periphery portion of the image pickup optical system 10 (see FIG. 1).

The signal processing section 22 performs noise reduction that reduces noise such as a fixed pattern noise, a dark current noise, or a shot noise (step S2) and a resolution reconstruction process (step S3). Next, the signal processing section 22 performs pixel interpolation (demozaicking) on the digital image signals that are transmitted in the order of the Bayer arrangement (step S4). In the demozaicking, by the interpolation of the image signals obtained by the image-taking of the object image, sensitivity level values of insufficient color components are generated. The signal processing section 22 composites a color image by demozaicking.

The signal processing section 22 performs automatic adjustment of white balance (Automatic White Balance Control; AWB) on the color image (step S5). Further, the signal processing section 22 performs a linear color matrix process for obtaining color reproducibility (step S6) and gamma correction for correcting chroma and brightness of the image to be displayed on a display and the like (step S7).

Note that, the procedures of the signal process illustrated in FIG. 2 are a mere example, and other processes may be added thereto, omittable processes may be omitted, and the order may be changed as appropriate. The respective processes may be performed by either of the camera module 1 and the ISP 2, and may be shared therewith.

Figure 3:
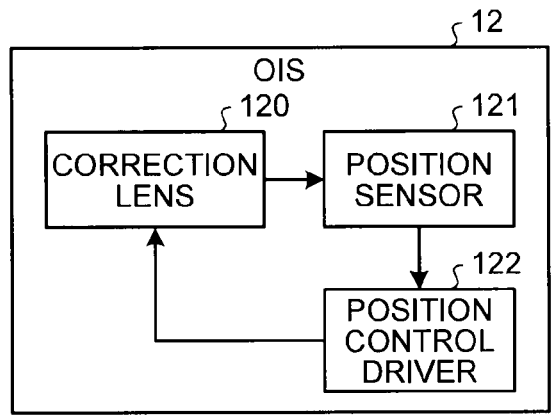
FIG. 3 is a block diagram illustrating a configuration of an OIS.

FIG. 3 is a block diagram illustrating a configuration of the OIS. The OIS 12 includes a correction lens 120, a position sensor 121, and a position control driver 122. The correction lens 120 is assembled in the image pickup optical system 10 (see FIG. 1). The OIS 12 modifies a focal aim of the image pickup optical system 10 by an adjustment of a position of the correction lens 120.

The position sensor 121 detects a moving direction and a movement distance of the camera module 1 by the camera shake. As the position sensor 121, a vibrating gyro mechanism may be used, for example. A processor (not illustrated) of the OIS 12 calculates a direction and a movement by which the correction lens 120 is to be moved from the detection result of the position sensor 121. The position control driver 122 adjusts the position of the correction lens 120 according to the direction and the movement calculated by the processor. As the position control driver 122, a voice coil motor (VCM) is used, for example.

The OIS 12 performs image stabilization by adjusting the position of the correction lens 120 so as to offset the movement of the camera module 1 due to the camera shake. When the position of the correction lens 120 is adjusted, the position sensor 121 performs resetting by a feedback circuit that assumes the current position of the correction lens 120 to be a zero point.

The camera module 1 utilizes the OIS 12 as the device for image stabilization, and in addition thereto, utilizes the OIS 12 in an image-taking mode for obtaining higher resolution than resolution corresponding to a number of pixels that the image sensor 11 has.

Figure 4:
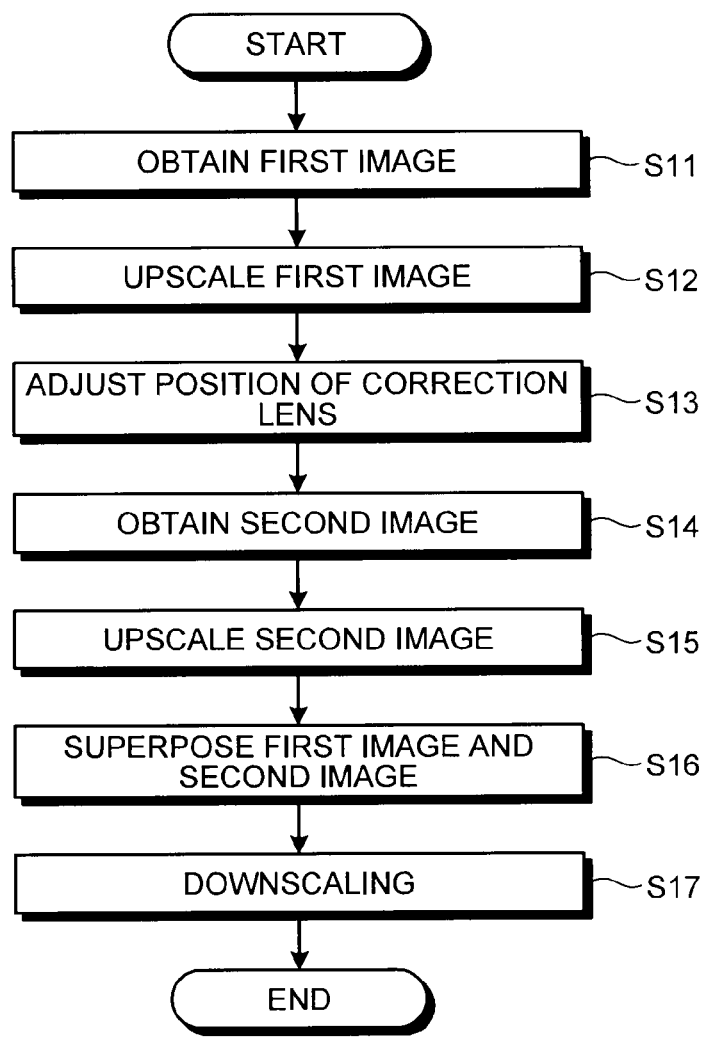
FIG. 4 is a flow chart explaining procedures of a process for obtaining high resolution by the camera module.

FIG. 4 is a flow chart explaining procedures of a process for obtaining high resolution by the camera module. The camera module 1 (see FIG. 1) obtains a first image by the image-taking by the image sensor 11 (step S11). The frame memory 14 retains the first image obtained by the camera module 1.

The scaling section 15 performs upscaling of the first image read from the frame memory 14 (step S12). For example, the scaling section 15 enlarges the first image by quadruple (doubled to a horizontal direction, and doubled to a vertical direction).

An effect of the upscaling depends on an algorithm used for scaling. The scaling section 15 can enlarge images without deteriorating image quality by using interpolation of bilinear or bicubic, for example. The scaling section 15 may perform the upscaling using algorithms other than the bilinear or bicubic.

Next, the OIS 12 adjusts the position of the correction lens 120 (step S13). The OIS 12 adjusts the position of the correction lens 120 such that a second image, which is obtained in succession to the first image, is moved by a movement less than a length of one pixel relative to the first image.

Assuming a scale factor of the upscaling by the scaling section 15 to be m (where m is an integer of 2 or more), the movement of the second image relative to the first image with respect to a first direction that is the horizontal direction (x direction) and a second direction that is perpendicular to the first direction and is the vertical direction (y direction) is set to be $1/\sqrt{m}$ times the length of one pixel after the upscaling. In case of assuming the scale factor of the upscaling to be quadruple (m=4), the movement is ½ the length of one pixel after the upscaling. The camera module 1 moves the correction lens 120 such that the second image shifts orthogonally for half a pixel relative to the first image.

In a case where the position sensor 121 detects movement of the camera module 1 due to the camera shake upon adjusting the position of the correction lens 120, the OIS 12 performs the image stabilization by deducting the movement for the present step. Due to this, obtaining high resolution and image stabilization can be performed simultaneously.

The camera module 1 obtains the second image by the image-taking by the image sensor 11 after having adjusted the position of the correction lens 120 in step S13 (step S14). The frame memory 14 retains the second image obtained by the camera module 1.

The scaling section 15 performs upscaling of the second image read from the frame memory 14 (step S15). The scaling section 15 enlarges the second image by the same scale factor as the upscaling of the first image in step S12.

The superposing section 16 superposes the first image upscaled in step S12 and the second image upscaled in step S15 (step S16). The scaling section 15 performs downscaling on the image obtained by the superposing in step S16 (step S17). The scaling section 15 shrinks the image to the size before the upscaling.

According to the above, the camera module 1 completes the process for obtaining high resolution. Note that, the camera module 1 may omit the downscaling in step S17, and may output the image in the size by which the upscaling was performed.

Figure 5:
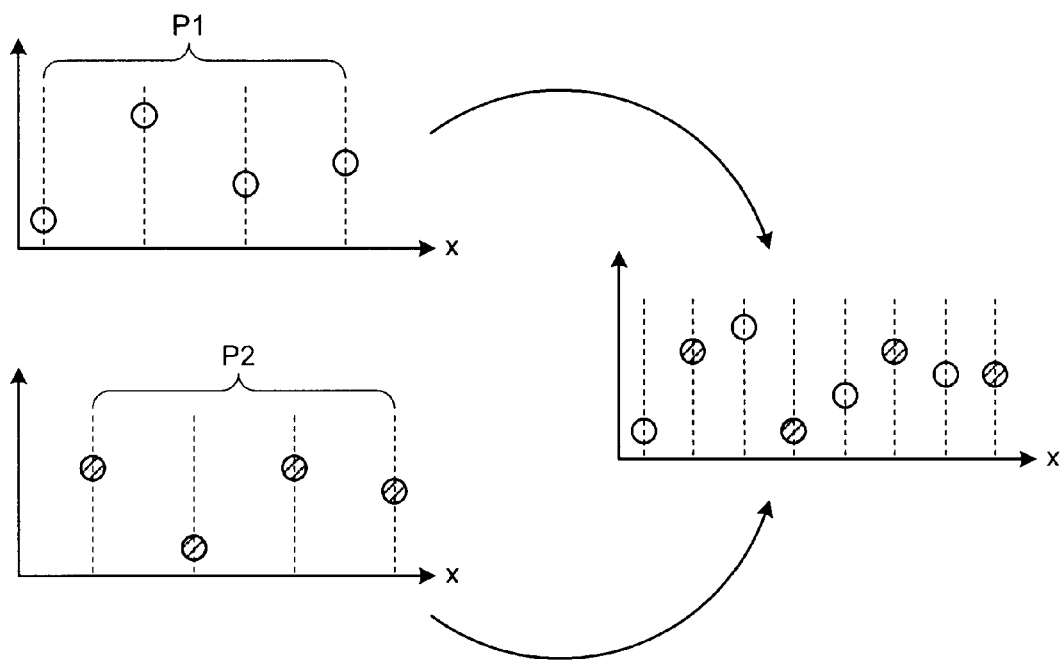
FIG. 5 and FIG. 6 are conceptual diagrams explaining obtaining high resolution by a superposing of a first image and a second image.
Figure 6:
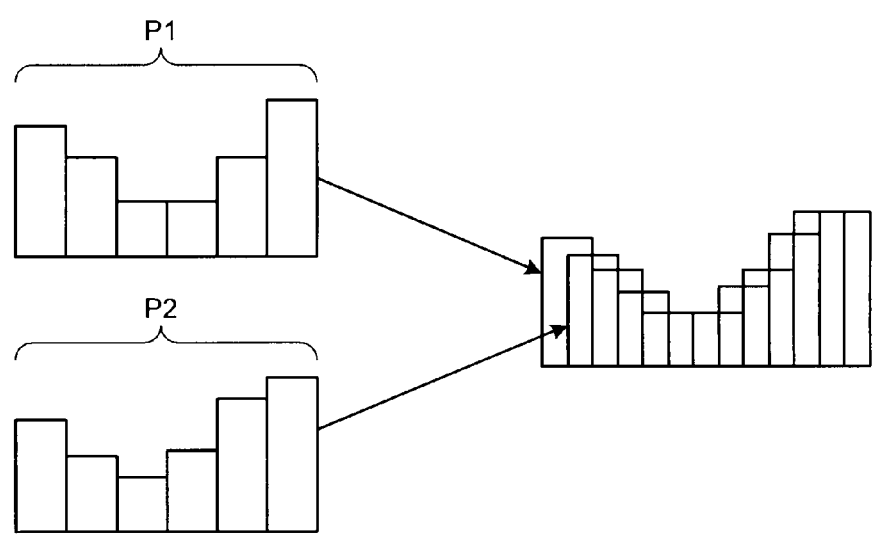

FIG. 5 and FIG. 6 are conceptual diagrams explaining obtaining high resolution by the superposing of the first image and the second image. FIG. 5 illustrates sampling points in the first image P1, sampling points in the second image P2 and sampling points in case of superposing the first image P1 and the second image P2. All of them have a sensitivity level as a vertical axis, and x coordinate as a horizontal axis. FIG. 6 illustrates distribution of the sensitivity level by bar graphs.

The sampling points in the x direction are doubled by shifting the second image P2 for half a pixel in the x direction relative to the first image P1. Further, as for the y direction also, the sampling points in the y direction are doubled by shifting the second image P2 for half a pixel in the y direction relative to the first image P1. With the sampling points being doubled respectively in the x direction and the y direction, the sampling points are quadrupled in a two-dimensional direction. As aforementioned, even in cases where only several sampling points for the respective images obtained by the image-taking are present, the sampling points can be increased by superposing the images by shifting.

Note that, the camera module 1 can make the scale factor of the upscaling to be greater than double if such is allowable in view of the processing time and the circuit scale. For example, the scale factor of the upscaling may be sixteen times (quadrupled to the horizontal direction, and quadrupled to the vertical direction, m=16), and the movement of the second image relative to the first image may be ¼ of the length of one pixel. In this case, three pieces of the second image that have been shifted by ¼ of the length of one pixel are obtained, and by superposing them with the first image, the sampling points for each of the images can be increased by sixteen times. The superposing section 16 is not limited to superposing one second image to the first image, and it may superpose a plurality of second images.

By employing techniques to increase the sampling points by superposing the images that are shifted relative to each other, the camera module 1 can suppress occurrences of defects such as discoloration and the like than in case of performing filtering process for spuriously obtaining high resolution. Further, by diverting the OIS 12 installed for image stabilization to the process for obtaining high resolution, the camera module 1 can realize obtaining high resolution by a simple configuration compared to adding constituent components separately. Due to this, the camera module 1 can obtain images with high resolution and high quality by the simple configuration.

Figure 7:
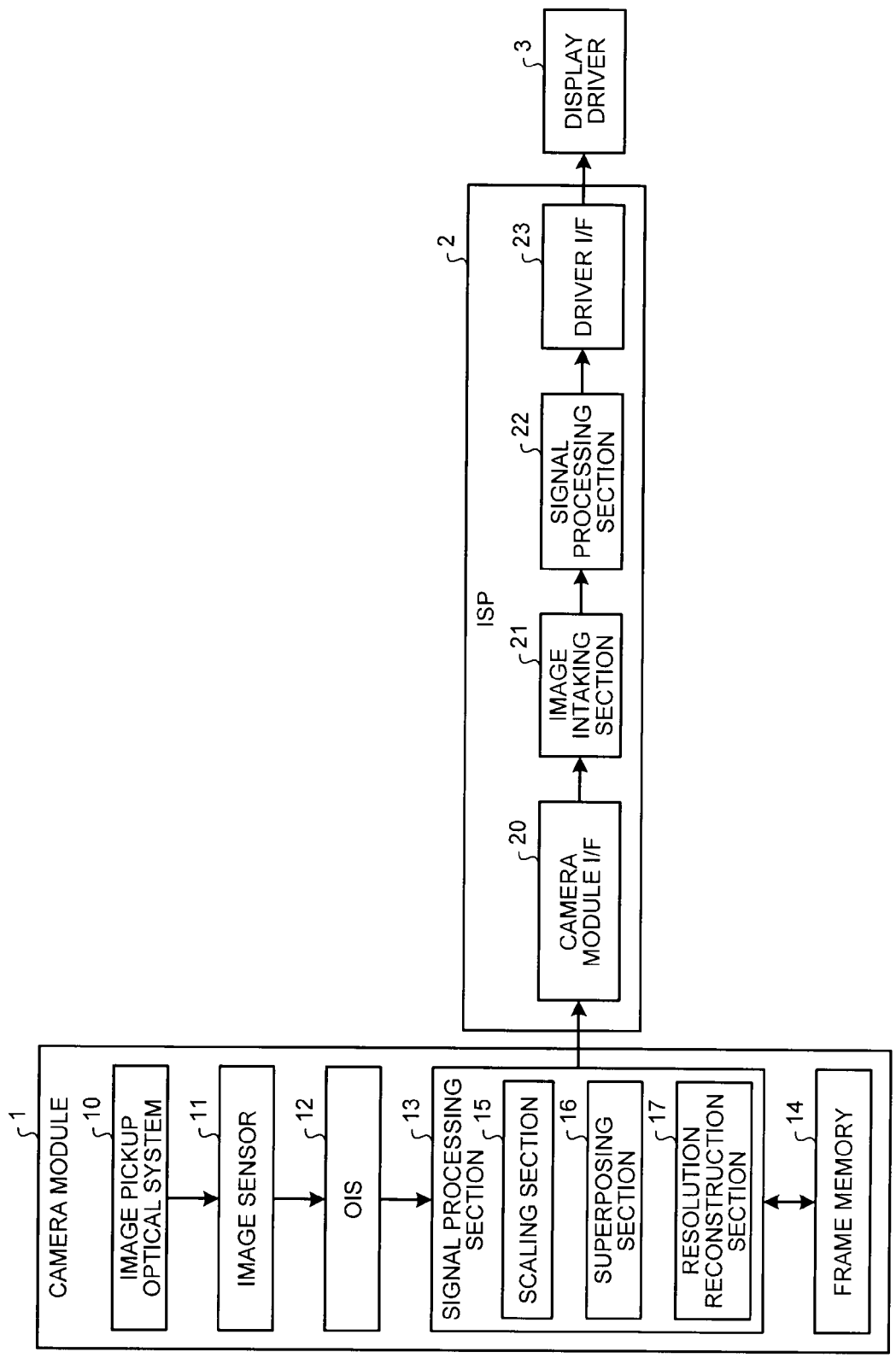
FIG. 7 is a block diagram illustrating a schematic configuration of an electronic apparatus including a camera module of a second embodiment.

FIG. 7 is a block diagram illustrating a schematic configuration of an electronic apparatus including a camera module of the second embodiment. In the second embodiment, components identical to those of the first embodiment will be given the same reference signs, and an overlapping explanation thereof will not be repeated. The signal processing section 13 includes the scaling section 15, the superposing section 16, and a resolution reconstruction section 17. The resolution reconstruction section 17 performs resolution reconstruction on an image obtained by an image-taking by the image sensor 11.

The resolution reconstruction section 17 performs the resolution reconstruction by estimating a lens character comprised by the image pickup optical system 10 such as scale factor chromatic aberration and amount of blur that cause blurs of color in a contour. The resolution reconstruction section 17 estimates the lens character comprised by the image pickup optical system 10 by referencing parameters stored in advance. As the lens character, a PSF (Point Spread Function) that is an optical transmission coefficient is used, for example. The resolution reconstruction section 17 estimates the PSF by using a least squares method for example.

The parameters referenced by the resolution reconstruction section 17 in estimating the lens character are, for example, ones indicating a manufacturing error of components such as a lens and the like, an assembly error of the components, an attachment error of the camera module 1 and the like. Due to this, the effect of the resolution reconstruction is securely obtained. The parameters are stored in, for example, an OTP (One Time Programmable memory, not illustrated) provided in the camera module 1, or the ISP 2.

The effect of the resolution reconstruction depends on an algorithm used for the reconstruction. As the process of the resolution reconstruction, in order to reconstruct an image similar to the original object image, a Richardson-Lucy method is used, for example.

FIG. 8 is a flow chart explaining procedures of a process for obtaining high resolution by the camera module. The camera module 1 obtains the first image by the image-taking by the image sensor 11 (step S21). The frame memory 14 retains the first image obtained by the camera module 1.

The resolution reconstruction section 17 performs resolution reconstruction of the first image read from the frame memory 14 (step S22). The scaling section 15 performs upscaling of the first image that has undergone the resolution reconstruction by the resolution reconstruction section 17 (step S23).

Next, the OIS 12 adjusts the position of the correction lens 120 (step S24). The OIS 12 adjusts the position of the correction lens 120 such that a second image, which is obtained in succession to the first image, is moved by a movement less than a length of one pixel relative to the first image.

The camera module 1 obtains the second image by the image-taking by the image sensor 11 after having adjusted the position of the correction lens 120 in step S24 (step S25). The frame memory 14 retains the second image obtained by the camera module 1.

The resolution reconstruction section 17 performs resolution reconstruction of the second image read from the frame memory 14 (step S26). The scaling section 15 performs upscaling of the second image that has undergone the resolution reconstruction by the resolution reconstruction section 17 (step S27). The scaling section 15 enlarges the second image by the same scale factor as the upscaling of the first image in step S23.

The superposing section 16 superposes the first image upscaled in step S23 and the second image upscaled in step S27 (step S28). The scaling section 15 performs downscaling on the image obtained by the superposing in step S28 (step S29). The scaling section 15 shrinks the image to the size before the upscaling.

According to the above, the camera module 1 completes the process for obtaining high resolution. Note that, the camera module 1 may omit the downscaling in step S29, and may output the image in the size by which the upscaling was performed.

Similar to the first embodiment, the second embodiment can obtain an image with high resolution and high quality by a simple configuration. Further, the second embodiment can obtain further quality in resolution by superposing the first image and the second image that have undergone the resolution reconstruction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera module comprising:
   an image pickup optical system into which a lens is assembled;
   an image sensor configured to take an image of an object imaged by the image pickup optical system;
   an image stabilization section configured to perform an image stabilization by an adjustment of a position of the lens;
   a resolution reconstruction section configured to perform a resolution reconstruction on the image obtained by an image-taking by the image sensor;

a scaling section configured to perform a scaling on the image; and a superposing section configured to superpose a plurality of images obtained by the image-taking, wherein in an image-taking mode for obtaining a higher resolution than a resolution corresponding to pixel number of the image sensor, the image stabilization section adjusts the position of the lens such that a second image is moved by a movement less than a length of one pixel relative to first image, the second image being obtained in succession to the first image after the first image is obtained by the image-taking, the resolution reconstruction section performs the resolution reconstruction on the first image and the second image, the scaling section performs upscaling on the first image and the second image by the same scale factor, the superposing section superposes the first image and the second image that have undergone the resolution reconstruction and the upscaling, the scaling section performs downscaling on an image obtained by the superposing to a size before the upscaling, and in the case where the image stabilization section detects movement of the camera module upon adjusting the position of the lens, the image stabilization section performs the image stabilization by deducting the movement.

2. The camera module according to claim 1, wherein assuming a scale factor of the upscaling by the scaling section to be m (where m is an integer of 2 or more), the movement of the second image relative to the first image with respect to a first direction and a second direction that is perpendicular to the first direction is set to be $1/\sqrt{m}$ times the length of one pixel.

3. An electronic apparatus comprising a camera module for recording an object image, wherein the camera module includes:

an image pickup optical system into which a lens is assembled;

an image sensor configured to take an image of an object imaged by the image pickup optical system;

an image stabilization section configured to perform an image stabilization by an adjustment of a position of the lens;

a resolution reconstruction section configured to perform a resolution reconstruction on the image obtained by an image-taking by the image sensor;

a scaling section configured to perform a scaling on the image; and a superposing section configured to superpose a plurality of images obtained by the image-taking, and wherein in an image-taking mode for obtaining a higher resolution than a resolution corresponding to pixel number of the image sensor, the image stabilization section adjusts the position of the lens such that a second image is moved by a movement less than a length of one pixel relative to first image, the second image being obtained in succession to the first image after the first image is obtained by the image-taking, the resolution reconstruction section performs the resolution reconstruction on the first image and second image, the scaling section performs upscaling on the first image and the second image by the same scale factor, the superposing section superposes the first image and the second image that have undergone the resolution reconstruction and the upscaling, the scaling section performs downscaling on an image obtained by the superposing to a size before the upscaling, and in the case where the image stabilization section detects movement of the camera module upon adjusting the position of the lens, the image stabilization section performs the image stabilization by deducting the movement.

4. The electronic apparatus according to claim 3, wherein assuming a scale factor of the upscaling by the scaling section to be m (where m is an integer of 2 or more), the movement of the second image relative to the first image with respect to a first direction and a second direction that is perpendicular to the first direction is set to be $1/\sqrt{m}$ times the length of one pixel.

5. A photographing method comprising;

taking an image by an image sensor of an object imaged by an image pickup optical system; and performing an image stabilization by an adjustment of a position of a lens assembled in the image pickup optical system, wherein in an image-taking mode for obtaining a higher resolution than a resolution corresponding to pixel number of the image sensor, the position of the lens is adjusted such that a second image is moved by a movement less than a length of one pixel relative to a first image, the second image being obtained in succession to the first image after the first image is obtained by the image-taking, a resolution reconstruction is performed on the first image and the second image, upscaling is performed on the first image and the second image that have undergone the resolution reconstruction by the same scale factor, the first image and the second image that have undergone the upscaling are superposed, downscaling is performed on an image obtained by the superposing to a size before the upscaling, movement of a camera module is detected upon adjusting the position of the lens, and the image stabilization is performed by deducting the movement.

6. The photographing method according to claim 5, wherein assuming a scale factor of the upscaling to be m (where m is an integer of 2 or more), the movement of the second image relative to the first image with respect to a first direction and a second direction that is perpendicular to the first direction is set to be $1/\sqrt{m}$ times the length of one pixel.

* * * * *